US012669871B2

(12) United States Patent (10) Patent No.: US 12,669,871 B2
Browne et al. (45) Date of Patent: Jun. 30, 2026

(54) HEAD-MOUNTED DISPLAY WITH USER-OPERATED CONTROL

(71) Applicant: Vision Products, LLC, Campbell, CA (US)

(72) Inventors: Michael P. Browne, San Mateo, CA (US); Kevin L. Mellott, San Jose, CA (US)

(73) Assignee: Vision Products, LLC, Campbell, CA (US)

( * ) Notice: Subject to any disclaimer, the term of this patent is extended or adjusted under 35 U.S.C. 154(b) by 0 days.

(21) Appl. No.: 18/642,528

(22) Filed: Apr. 22, 2024

(65) Prior Publication Data

US 2024/0272726 A1 Aug. 15, 2024

Related U.S. Application Data

(63) Continuation of application No. 17/541,213, filed on Dec. 2, 2021, now Pat. No. 11,995,243, which is a
(Continued)

(51) Int. Cl.
*G06F 3/01* (2006.01)
*G02B 27/01* (2006.01)
(Continued)

(52) U.S. Cl.
CPC ......... *G06F 3/017* (2013.01); *G02B 27/0172* (2013.01); *G06F 3/014* (2013.01);
(Continued)

(58) Field of Classification Search
CPC .......... G06F 3/017; G06F 3/014; G06F 3/167; G06F 3/011; G02B 27/0172; G06V 40/28; G06V 20/20; G06V 40/113; G06V 40/20; G09G 3/20; G09G 2320/0606; G09G 2354/00
See application file for complete search history.

(56) References Cited

U.S. PATENT DOCUMENTS 3,410,629 A 11/1968 Carpenter et al.
4,698,857 A 10/1987 Kastendieck et al.
(Continued)

FOREIGN PATENT DOCUMENTS

JP 2010-145674 A 7/2010

OTHER PUBLICATIONS

United States Office Action, U.S. Appl. No. 15/146,789, dated Jul. 28, 2016, 15 pages.
(Continued)

*Primary Examiner* — Grant Sitta
(74) *Attorney, Agent, or Firm* — Fenwick & West LLP

(57) ABSTRACT

A system may include an external facing camera arranged to capture images of an external environment in front of a user, a display configured to display images, and a beam combiner that provides a first optical path and a second optical path. The first optical path directs images from the display to an eye, and the second optical path directs light from the external environment to the eye. The system may include a shutter positioned along the second optical path, where the system is configured to operate in one of a plurality of states including an electronic see-through state and an optical see-through state.

17 Claims, 8 Drawing Sheets

Control 105

Combiner 107

HMD 101

Idle State View
103

Related U.S. Application Data continuation of application No. 16/777,764, filed on Jan. 30, 2020, now Pat. No. 11,204,649.

(51) Int. Cl.

| | |
|---|---|
| *G06F 3/16* | (2006.01) |
| *G06V 40/20* | (2022.01) |
| *G09G 3/20* | (2006.01) |

(52) U.S. Cl.
CPC ............. *G06F 3/167* (2013.01); *G06V 40/28* (2022.01); *G09G 3/20* (2013.01); *G09G 2320/0606* (2013.01); *G09G 2354/00* (2013.01)

(56) References Cited

U.S. PATENT DOCUMENTS

| | | | |
|---|---|---|---|
| 5,140,416 | A | 8/1992 | Tinkler |
| 5,408,086 | A | 4/1995 | Morris et al. |
| 5,473,365 | A | 12/1995 | Okamura |
| 5,572,343 | A | 11/1996 | Okamura et al. |
| 5,726,807 | A | 3/1998 | Nakaoka et al. |
| 5,850,625 | A | 12/1998 | Maren et al. |
| 5,900,849 | A | 5/1999 | Gallery |
| 6,075,644 | A | 6/2000 | Filipovich |
| 6,087,660 | A | 7/2000 | Morris et al. |
| 6,201,641 | B1 | 3/2001 | Filipovich |
| 6,396,639 | B1 | 5/2002 | Togino et al. |
| 6,407,724 | B2 | 6/2002 | Waldern et al. |
| 6,462,894 | B1 | 10/2002 | Moody |
| 6,560,029 | B1 | 5/2003 | Dobbie et al. |
| 6,653,989 | B2 | 11/2003 | Nakanishi |
| 6,757,008 | B1 | 6/2004 | Smith |
| 6,909,539 | B2 | 6/2005 | Korniski et al. |
| 6,947,219 | B1 * | 9/2005 | Ou ....................... G02B 27/017 |
| | | | 351/158 |
| 7,072,107 | B2 | 7/2006 | Filipovich et al. |
| 7,158,296 | B1 | 1/2007 | Schwartz et al. |
| 7,219,370 | B1 | 5/2007 | Teetzel et al. |
| 7,255,437 | B2 | 8/2007 | Howell et al. |
| 7,289,272 | B2 | 10/2007 | Bowron et al. |
| 7,307,793 | B2 | 12/2007 | Ottney et al. |
| 7,315,254 | B2 | 1/2008 | Smith et al. |
| 7,345,277 | B2 | 3/2008 | Zhang |
| 7,381,952 | B2 | 6/2008 | Teich et al. |
| 7,418,392 | B1 | 8/2008 | Mozer et al. |
| 7,746,551 | B2 | 6/2010 | Schwartz et al. |
| 7,806,533 | B2 | 10/2010 | Boute et al. |
| 8,184,067 | B1 | 5/2012 | Braun et al. |
| 8,497,465 | B2 | 7/2013 | Hammond |
| 8,542,326 | B2 | 9/2013 | MacNaughton et al. |
| 8,651,748 | B2 | 2/2014 | Vom et al. |
| 8,736,967 | B1 | 5/2014 | Browne et al. |
| 8,817,196 | B2 | 8/2014 | De La Tocnaye et al. |
| 8,866,702 | B1 | 10/2014 | Wong et al. |
| 8,907,867 | B2 | 12/2014 | Wong et al. |
| 9,010,955 | B2 | 4/2015 | Robinson |
| 9,016,857 | B2 | 4/2015 | Benko et al. |
| 9,064,442 | B2 | 6/2015 | Kimura |
| 9,158,115 | B1 | 10/2015 | Worley et al. |
| 9,264,608 | B2 | 2/2016 | Lee et al. |
| 9,285,872 | B1 | 3/2016 | Raffle et al. |
| 9,405,918 | B2 | 8/2016 | Freed et al. |
| 9,429,759 | B2 | 8/2016 | Hoellwarth |
| 9,429,771 | B2 | 8/2016 | Kim et al. |
| 9,523,856 | B2 | 12/2016 | Osterhout et al. |
| 9,651,786 | B1 * | 5/2017 | Browne .................. G02B 26/04 |
| 9,866,286 | B1 | 1/2018 | Qu et al. |
| 10,342,425 | B1 | 7/2019 | Rana et al. |
| 10,345,625 | B2 | 7/2019 | Howell et al. |
| 10,371,944 | B2 | 8/2019 | Mallinson |
| 10,451,878 | B2 | 10/2019 | Browne |
| 10,621,992 | B2 | 4/2020 | Qian et al. |
| 10,624,790 | B2 | 4/2020 | Chao et al. |
| 10,775,632 | B1 | 9/2020 | Chapalamadugu et al. |
| 10,824,253 | B2 | 11/2020 | Osterhout |
| 10,860,100 | B2 | 12/2020 | Osterhout et al. |
| 10,957,279 | B2 | 3/2021 | Hobson |
| 11,016,302 | B2 | 5/2021 | Freeman et al. |
| 11,733,530 | B1 | 8/2023 | Wang et al. |
| 12,248,146 | B1 | 3/2025 | Correa et al. |
| 2002/0070916 | A1 | 6/2002 | Noro et al. |
| 2003/0129567 | A1 | 7/2003 | Cabato et al. |
| 2003/0231804 | A1 | 12/2003 | Bacarella et al. |
| 2004/0104864 | A1 | 6/2004 | Nakada |
| 2004/0175020 | A1 | 9/2004 | Bradski et al. |
| 2004/0227703 | A1 | 11/2004 | Lamvik et al. |
| 2005/0046702 | A1 | 3/2005 | Katayama et al. |
| 2006/0103591 | A1 | 5/2006 | Tanimura et al. |
| 2007/0057068 | A1 | 3/2007 | Tsai |
| 2008/0136923 | A1 | 6/2008 | Inbar et al. |
| 2008/0170119 | A1 | 7/2008 | Mccann |
| 2008/0309774 | A1 | 12/2008 | Beng Goh et al. |
| 2009/0051760 | A1 | 2/2009 | Ottney |
| 2009/0167966 | A1 | 7/2009 | Nam et al. |
| 2009/0251680 | A1 | 10/2009 | Farsaie |
| 2010/0128135 | A1 | 5/2010 | Filipovich et al. |
| 2010/0128138 | A1 | 5/2010 | Nitta et al. |
| 2011/0077056 | A1 | 3/2011 | Park et al. |
| 2011/0102672 | A1 * | 5/2011 | Estrop .................... H04N 7/012 |
| | | | 348/E7.003 |
| 2011/0156998 | A1 | 6/2011 | Huang et al. |
| 2012/0002064 | A9 | 1/2012 | Filipovich et al. |
| 2012/0050141 | A1 | 3/2012 | Border et al. |
| 2012/0081564 | A1 | 4/2012 | Kamiya |
| 2012/0119978 | A1 | 5/2012 | Border et al. |
| 2012/0182326 | A1 | 7/2012 | Moore |
| 2012/0257005 | A1 | 10/2012 | Browne |
| 2013/0234935 | A1 | 9/2013 | Griffith |
| 2013/0248691 | A1 | 9/2013 | Mirov et al. |
| 2014/0327962 | A1 | 11/2014 | Teetzel et al. |
| 2015/0029088 | A1 | 1/2015 | Kim et al. |
| 2015/0130711 | A1 | 5/2015 | Lee et al. |
| 2015/0130911 | A1 | 5/2015 | Ohashi |
| 2015/0138081 | A1 | 5/2015 | Iwatsu et al. |
| 2015/0153572 | A1 | 6/2015 | Miao et al. |
| 2015/0168726 | A1 | 6/2015 | Kimura et al. |
| 2015/0212681 | A1 | 7/2015 | Shinozaki et al. |
| 2015/0317837 | A1 | 11/2015 | Sholudko et al. |
| 2015/0346813 | A1 | 12/2015 | Vargas et al. |
| 2016/0025978 | A1 * | 1/2016 | Mallinson .......... G02B 27/0172 |
| | | | 345/8 |
| 2016/0133201 | A1 | 5/2016 | Border et al. |
| 2016/0210097 | A1 | 7/2016 | Forutanpour et al. |
| 2017/0285765 | A1 | 10/2017 | Kimura |
| 2019/0025594 | A1 | 1/2019 | Holmer et al. |
| 2019/0294239 | A1 | 9/2019 | Suzuki et al. |
| 2019/0346918 | A1 | 11/2019 | Akkaya et al. |
| 2020/0035205 | A1 | 1/2020 | Nishibe et al. |
| 2020/0348536 | A1 | 11/2020 | Giraudet et al. |
| 2021/0065660 | A1 | 3/2021 | Zhong et al. |
| 2021/0116960 | A1 | 4/2021 | Wang et al. |
| 2022/0147149 | A1 | 5/2022 | Browne |
| 2022/0317450 | A1 * | 10/2022 | Deltel ................. G02F 1/13318 |

OTHER PUBLICATIONS

Wilburn, B., "High Performance Imaging Using Arrays of Inexpensive Cameras", A Dissertation Submitted to the Department of Electrical Engineering and The Committee on Graduate Studies of Stanford University in Partial Fulfillment of the Requirements for the Degree of Doctor of Philosophy, Dec. 2004, pp. 1-128.

United States Office Action, U.S. Appl. No. 17/541,213, dated Sep. 26, 2022, 14 pages.

United States Office Action, U.S. Appl. No. 17/541,213, dated Feb. 10, 2023, 15 pages.

United States Office Action, U.S. Appl. No. 17/541,213, dated Oct. 11, 2023, 16 pages.

United States Office Action, U.S. Appl. No. 18/660,119, filed Apr. 23, 2025, 30 pages.

(56) References Cited

OTHER PUBLICATIONS

Moore, S.A., "Anamorphic Eyepiece for Increased Field of View", International Optical Design Conference (IODC), Jun. 13, 2010, 5 pages.

* cited by examiner

Control
105

HMD
101

Combiner
107

Idle State View
103

Active State View
109A

Active State View
109B

HMD
201

Active State View
205

DURATION: 00:43

BLOODPRESSURE 120

BEAR BEAS

Idle State View
203

Activation 505 — Deactivation 507 — Activation 505

Idle State 501A → Active State 503A → Idle State 501B → Active State 503B

Deactivation 507

HEAD-MOUNTED DISPLAY WITH USER-OPERATED CONTROL

CROSS-REFERENCE TO RELATED APPLICATION

This application is a continuation of U.S. patent application Ser. No. 17/541,213, filed on Dec. 2, 2021, which is a continuation of U.S. patent application Ser. No. 16/777,764, filed on Jan. 30, 2020, each of which is incorporated by reference in its entirety.

BACKGROUND

1. Technical Field

This disclosure relates generally to head-mounted displays (HMDs), and more particularly, to operational states of see-through HMDs.

2. Description of Related Art

Head-mounted displays (HMDs) are display devices worn on the heads of users and can display augmented reality (AR), mixed reality (MR), or virtual reality (VR) images. HMDs are used in a variety of fields, including gaming, engineering, medicine, warfare, and aviation. For example, HMDs may be useful for training and simulation exercises.

Optical see-through HMDs (also referred to as transparent HMDs) overlay digital images onto a view of the user's external environment. The images may include information useful to the user, such as the time, date, GPS coordinates, messages, etc. However, in some situations, the overlaid images can be distracting. For example, information (such as a map) can obscure the user's view of objects in the external environment. For demanding or stressful situations, such as a soldier on a battlefield or a surgeon performing surgery, distracting electronic information may be problematic because it can lead to injury or death. Conventional solutions include turning the HMD off, removing the HMD, or reducing the brightness of the displayed images. However, these solutions terminate or reduce the usefulness of the HMD, may be time consuming to perform, and may distract the user from their activities in the external environment.

SUMMARY

The present disclosure provides an HMD that can quickly switch between an active state that displays images and an idle state that displays no light or a reduced amount of light. The HMD displays images to a user via a display device and beam combiner. The beam combiner allows the user to view light from the external environment and from the display. By default, the HMD remains in an idle state in which the display emits no light or a reduced amount of light compared to the active state. Thus, the idle state may allow the user to view the external environment without light from the display obscuring the user's view. By activating a control, the user can cause the HMD to temporarily switch to an active state. During the active state, the display displays images such as augmented reality or virtual reality images to the user. The HMD may remain in the active state only while the control remains activated by the user and may switch back to the idle state once the user deactivates or ceases activating the control. For example, the control may be a button on the side of the HMD. The user can switch the HMD to the active state by pressing and holding the button. Similarly, the HMD may switch back to the idle state after the user releases the button.

The control is generally designed to be quickly and easily accessed and activated by the user. This allows the user to interact with the control with little or no interruption to their activities in the external environment and allows the user to quickly change the HMD from the idle state to the active state and vice versa. Controls that disrupt user activities, such as a control that is difficult for the user to locate or activate, may be undesirable. Thus, the HMD lets users in stressful or demanding situations operate in the external environment without distraction, yet view images from the display when desired.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In one aspect, a head-mounted display (HMD) system displays images to a user. The system has an active state and an idle state. The system includes a display device, a beam combiner, and a user-operated control. The display device displays images when the system is in the active state and emits a reduced amount or no light when the system is in the idle state. The beam combiner provides a first optical path for light from an external environment to the user's eye and also provides a second optical path for light emitted from the display device to the user's eye. Responsive to activation of the user-operated control by the user, the control switches the system between states that include the active state and the idle state. The idle state may be a default state and the system may remain in the active state only while the user-operated control remains activated by the user. FIGS. 1 and 2 illustrate example applications of the HMD and example active and idle states.

Figure 1A:
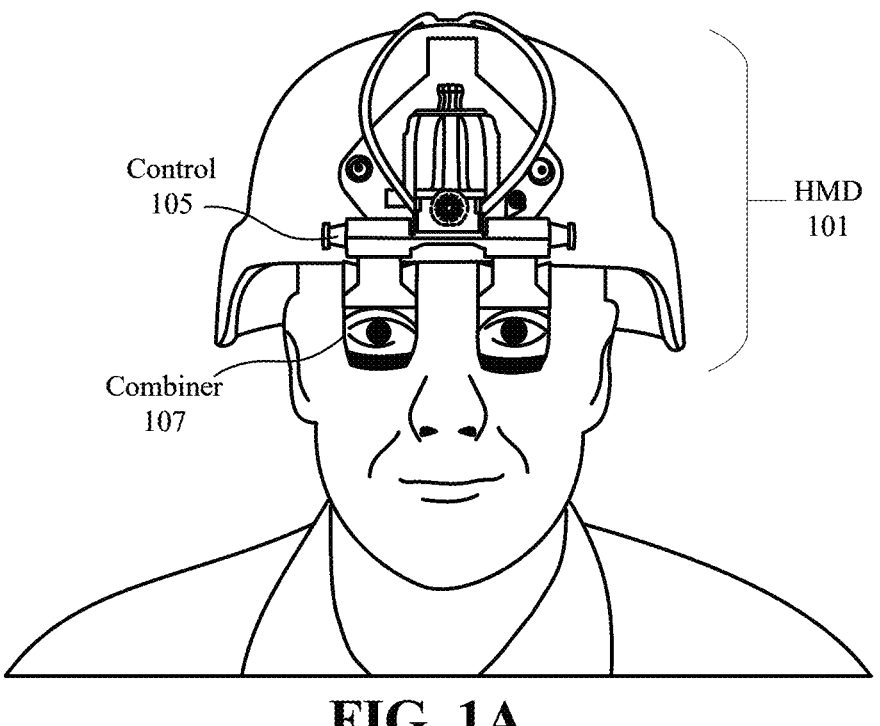
FIG. 1A illustrates a soldier wearing an HMD when the HMD is in an idle state, according to an embodiment.
Figure 1B:
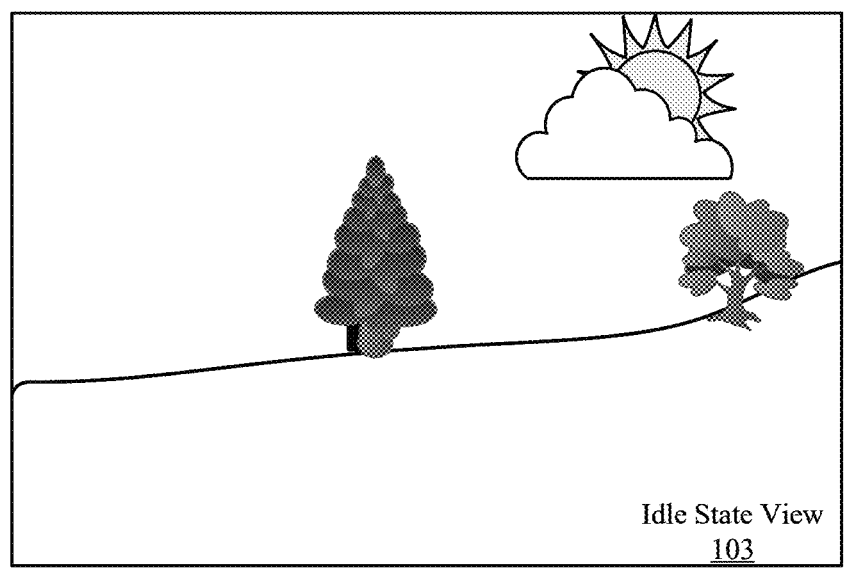
FIG. 1B illustrates a view of an external environment as seen by the soldier when the HMD is in the idle state, according to an embodiment.

FIG. 1A is an image of a soldier wearing an HMD 101, and FIG. 1B is the soldier's view 103 of an external environment. In these figures, the HMD is in the idle state (e.g., because the control 105 is not being activated by the soldier). Thus, the soldier's view is unobstructed by images from the display of the HMD. In this example HMD, the control 105 is a button on a support mount of the combiner 107, and the soldier can activate the control 105 by pressing and holding the button inward (e.g., see FIG. 1C). If the soldier ceases pressing the button, the HMD switches back to the idle state. However, other state transitions are possible (e.g., see FIG. 5 and related description).

Figure 1C:
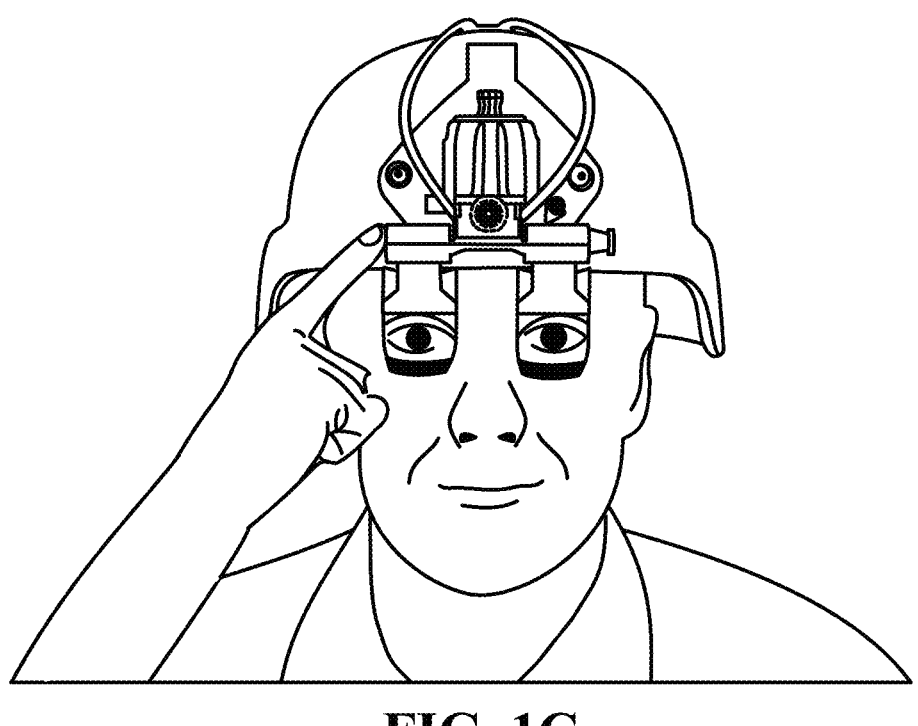
FIG. 1C illustrates a soldier wearing an HMD when the HMD is in an active state, according to an embodiment.
Figure 1D:
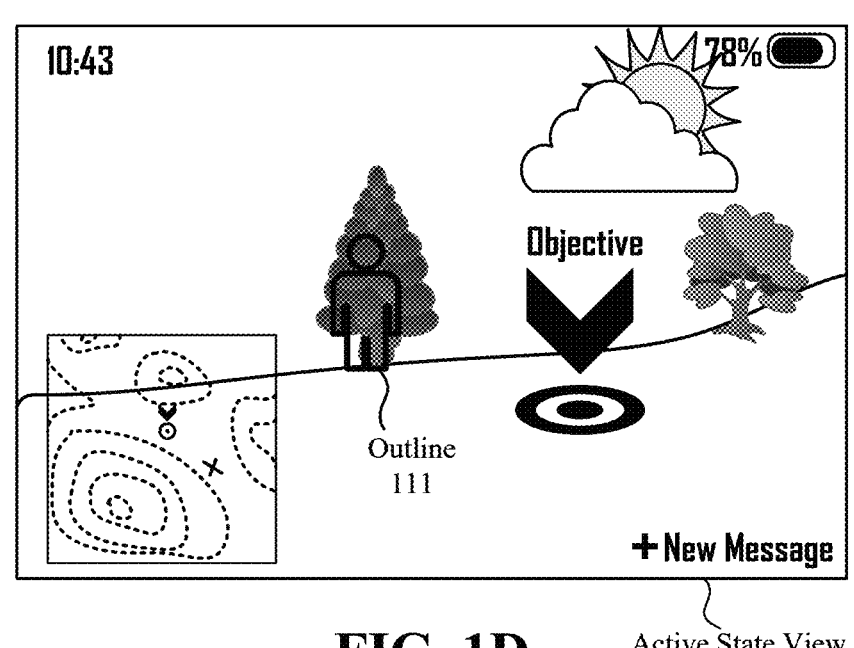
FIGS. 1D and 1E illustrate views as seen by the soldier when the HMD is in an active state, according to an embodiment.
Figure 1E:
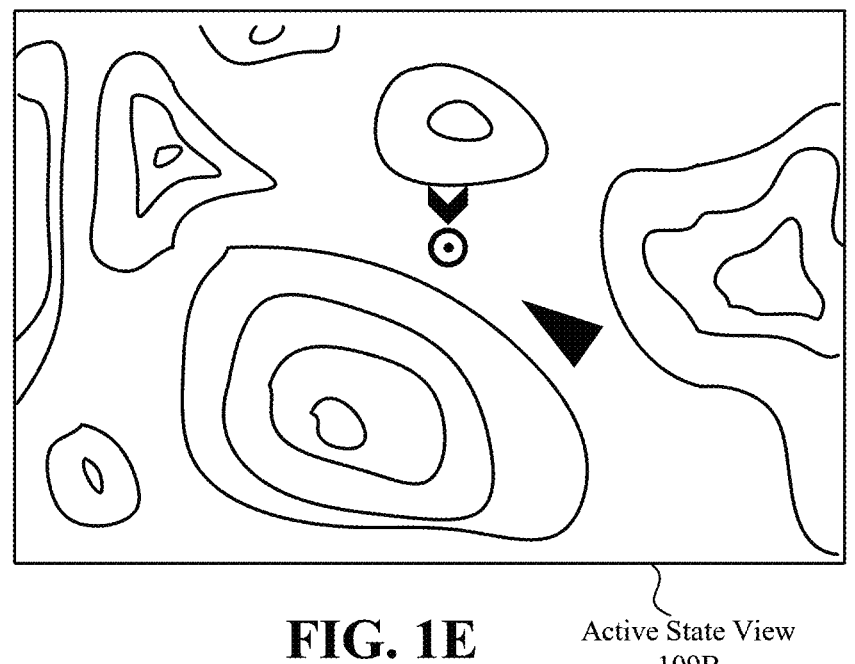

FIG. 1C is an image of the soldier pressing the control 105 inward, and FIG. 1D is an example of the soldier's view 109A. Since the control 105 activated by the soldier, the HMD is in an active state. In this example active state, augmented reality (AR) images are overlaid onto the soldier's view 109A of the external environment. The AR images include a map (lower left corner), an objective marker, a new message indicator (lower right corner), the time (upper left corner), and the battery level of the HMD (upper right corner). The view 109A also includes an outline 111, which indicates the presence of a human behind the tree. Since the human may be difficult to notice in the idle state view 103, the indicator 111 may help the soldier recognize the presence of the human. FIG. 1E is another example of the solider's view 109B. In this example active state, an image is displayed to the soldier and light from the external environment is blocked, for example by a shutter (e.g., see FIG. 4B). In the example of FIG. 1E, the image is a map with a triangle that indicates the soldier's location and orientation. Thus, the map may assist the soldier to determine their location. In some embodiments, the HMD includes multiple active states so that the soldier can access view 109A or view 109B by activating the control. Multiple active states are further described with respect to FIG. 5.

Figure 2A:
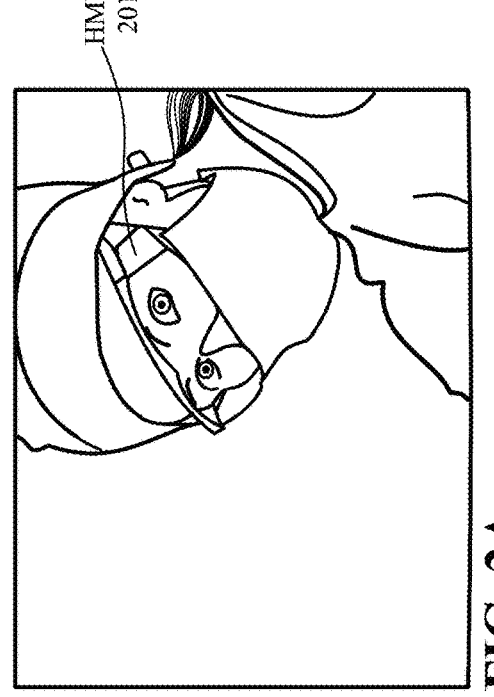
FIG. 2A is an illustration of a surgeon wearing an HMD, according to an embodiment.
Figure 2C:
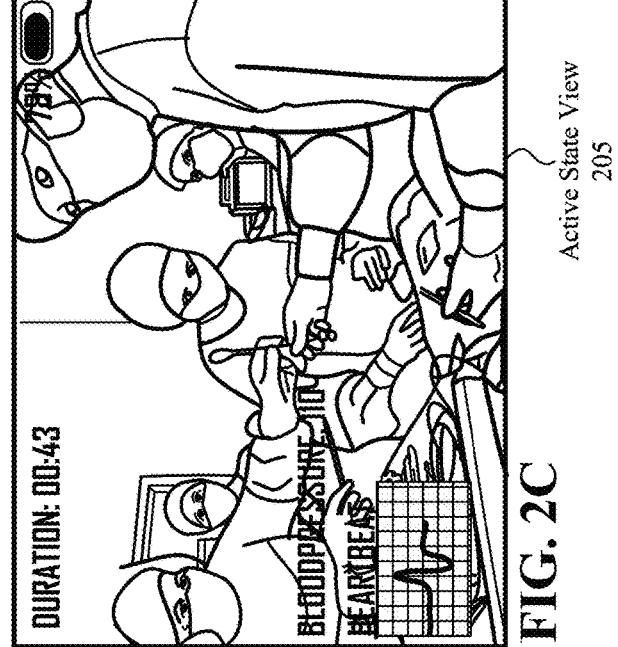
FIGS. 2B and 2C are views of an external environment as seen by the surgeon when the HMD is in an idle state and an active state, respectively, according to some embodiments.
Figure 2B:
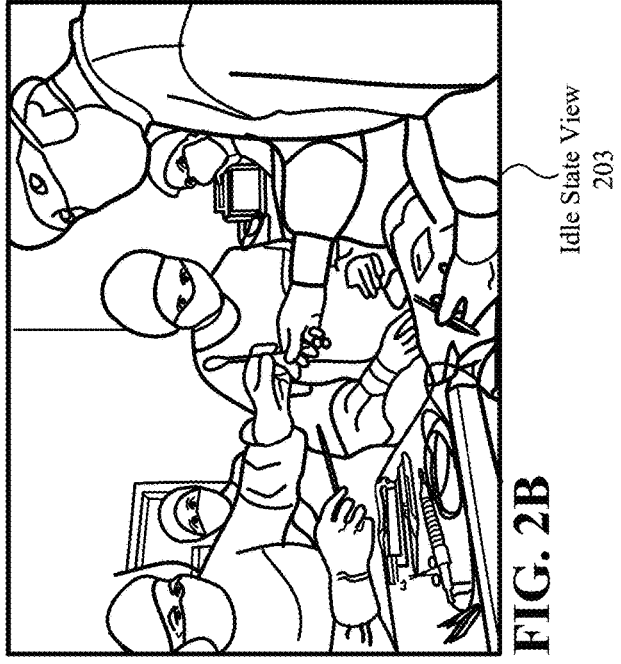

FIG. 2A is an image of a surgeon wearing an HMD 201. FIG. 2B is the surgeon's view 203 while the HMD is in the idle state, and FIG. 2C is the surgeon's view 205 while the HMD is in an active state. Similar to FIGS. 1B and 1D, the idle state view 203 does not include images from the display of the HMD, and the active state view 205 includes overlaid AR images. The AR images include a surgery duration clock (top left corner), a blood pressure indicator, and a heart rate monitor (lower left corner). Since it may be desirable for the surgeon to activate the control without their hands, the control may be a foot pedal near the surgeon's foot (not illustrated). By pressing the pedal, the HMD switches to the active state. In another example, the control is activated by a hand gesture, voice command, or head gesture.

Overall, the images in FIGS. 1D and 1E may assist the soldier to navigate and operate in the external environment and the AR images in FIG. 2C may assist the surgeon to perform surgery. However, it may be undesirable for the images to be continuously displayed. Thus, the images may be displayed only while the control is activated by the user.

Other example applications of the HMD include a pilot viewing AR images, such as flight symbology or a flight checklist or an aircraft maintainer viewing repair checklists or images from an electronic maintenance manual.

Figure 3:
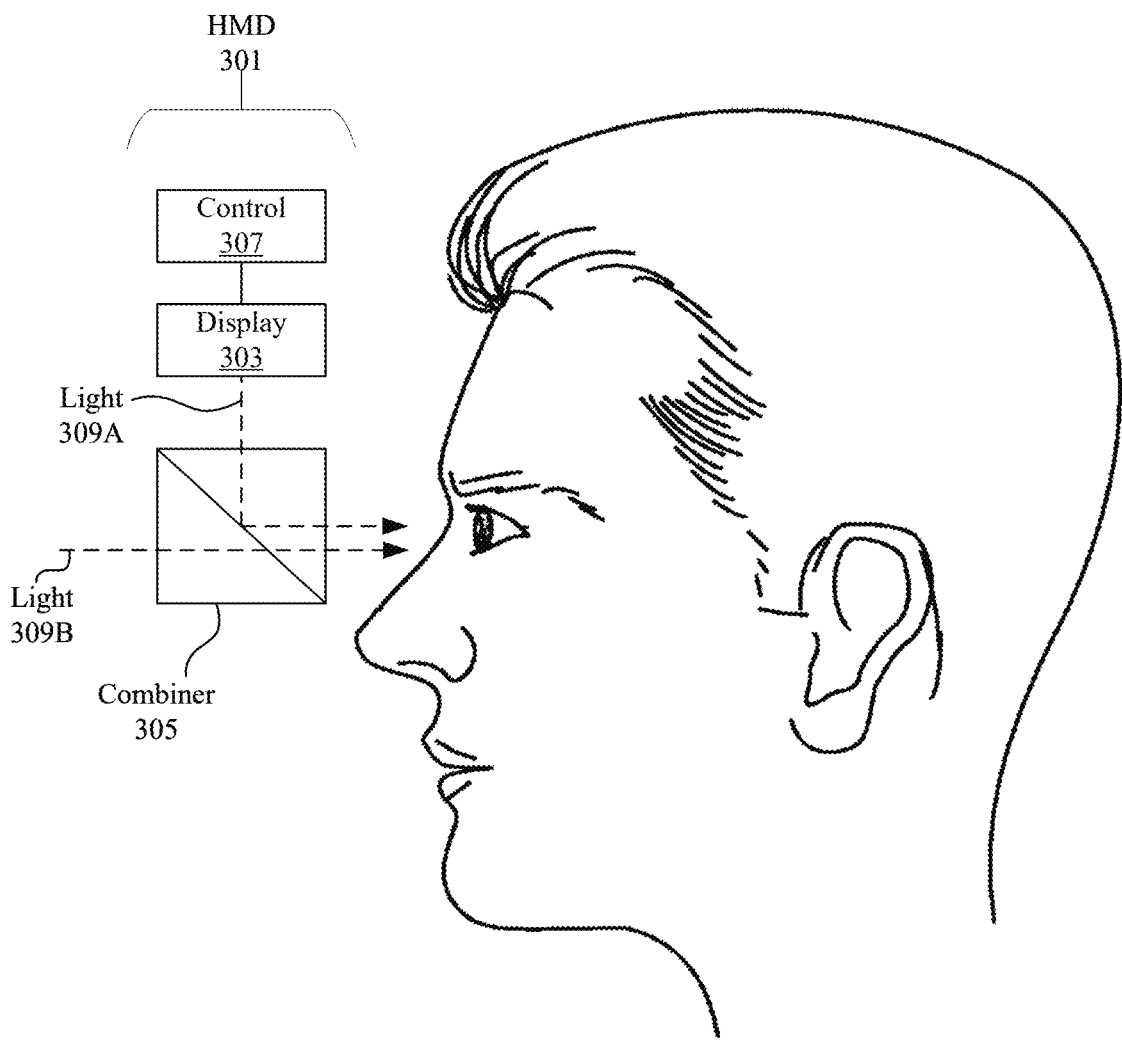
FIG. 3 is a diagram of an HMD that includes a display, a beam combiner, and a user-operated control, according to an embodiment.

FIG. 3 is a block diagram of an optical see-through HMD 301 that includes a display 303, a beam combiner 305, and a user-operated control 307, according to an embodiment. The control 307 is coupled to the display 303. The display 303 is positioned above the user's eye, however other configurations are possible (e.g., the display 303 is below or to the side of the user's eye). The combiner 305 is positioned to direct light 309A from the display 303 and light 309B from an external environment to the user's eye. The components 303-307 of the HMD may be supported by a frame (not illustrated) that can be worn on or around the user's head. Furthermore, while the components are illustrated as blocks, the components can take on many different shapes and configurations. For example, the HMD may be similar to a pair of glasses or goggles.

The display 303 can display images that are directed to the user. For example, the display 303 may be a liquid crystal display (LCD), an organic light emitting diode (OLED) display or a microLED device. The HMD may have any number of displays 303. The images displayed by the display 303 may include information, such as text, images, graphics, and videos, that modify or augment the user's view of the external environment. The information may be specific to the user's view of the external environment, such as information that identifies people and objects, and it may assist the user to navigate or operate in the external environment. The images are generated by a processing system (not illustrated) and are transmitted to the display 303, for example, using wired or wireless technologies. The processing system may be integrated into the HMD or located outside of the HMD.

As previously described, the combiner 305 combines images from the display 303 with light from the external environment by directing light 309B (via a first optical path) from the external environment to the user's eye and by directing light 309A (via a second optical path) from the display 303 to the user's eye. The combiner 305 may include partially metallized mirrors, dielectric coatings, dichroic coatings and/or interference coatings disposed on a transmissive material, partially transmissive mirror, waveguide device, or polarized beam combiner. Additionally, the combiner 305 may include one or more focusing and/or collimating lenses. In some embodiments, the combiner 305 has optical power that magnifies or shrinks images. The HMD may have a single combiner 305 that directs light to one or both eyes of the user, or the HMD may include one or more combiners 305 for each eye.

The HMD can operate in one of many predetermined operational states. The states determine the content of the images displayed by the display 303. The states include an active state and an idle state. When the HMD is in the active state, the display 303 displays images, such as mixed reality (MR), AR, or virtual reality (VR) images, that can be viewed by the user. When the HMD is in the idle state, the display 303 does not emit light or emits a reduced amount of light compared to the active state. The active and idle states are further described below with reference to FIGS. 4 and 5.

The control 307 is a user-operated device that can change the state of the HMD in response to the user activating the control 307. For example, activation of the control 307 switches the HMD from the idle state to the active state. This provides the user with the ability to choose when to access the active state (e.g., at a time when the images will not distract the user). Since the HMD may be used in situations where images from the display 303 may be distracting, the HMD may remain in the active state only while the control 307 remains activated by the user. This allows the HMD to quickly enter and exit the active state and thus reduce the possibility of the images distracting the user.

The control 307 may be part of (e.g., integrated into) the HMD. In these embodiments, the control 307 may be designed to be easily activated by the user without the user visually looking at the control 307. For example, the control 307 may be a button on the side of the HMD that the user can locate and activate by touch. Alternatively, the control 307 may be physically separated from the HMD. For example, the control 307 is located on a tool or piece of equipment. In these embodiments, the control 307 is (e.g., wirelessly) communicatively coupled to the HMD. The control 307 may be activated by multiple methods, and the control 307 may be deactivated or may cease being activated through multiple methods.

The HMD may include more than one control 307 and the controls may not be located near each other. For example, a control 307 is located on the HMD, on the user's belt, and by the user's foot. In another example, a control 307 is located on a tool (such as a two-handed tool) and on the HMD. Examples of tools include a weapon, such as a firearm, and a radio. This may allow the user to activate the control while using the tool and in situations where the tool is out of reach. The controls 307 may each perform the same function or a different function. For example, a first control is associated with an AR active state and a second control is associated with a VR active state. A control 307 may also be activated by a person not wearing the HMD. For example, a nurse may have access to a control 307 that is coupled to a surgeon's HMD.

In some cases, the control 307 is manually activated by the user (e.g., an action by the user causes the control to be activated). For example, the control 307 is a touch screen and the user activates the control 307 by interacting with the touch screen. In other cases, the control 307 is activated automatically (e.g., the HMD changes states if certain criteria are met). For example, if a surgeon is performing surgery, the HMD may switch from the idle state to the active state (e.g., to alert the surgeon) if the patient's heartbeat decreases below a desired threshold. In cases where the control is activated automatically, the control may not be considered user-activated.

The control 307 may be a mechanical control, such as a button, switch, lever, roller, pedal, or slider. A mechanical control is activated by physically moving a component of the control 307. A mechanical control may remain activated by the user holding the control in an activated position (e.g., the control may automatically switch back to its original position if the user releases the control). In another example, a mechanical control remains activated by the user periodically activating the control (e.g., within a threshold amount of time). For example, pressing the control 307 every 5 seconds results in the HMD remaining in the active state.

In the previous control examples, the user can activate the control with a finger, hand, foot, or similar body part. In some embodiments, the control 307 may respond to audio, visual, or motion activations by the user. For example, the user can activate the control by a voice command. In this example, the control 307 may include an audio capturing device, such as a microphone, that records audio. The control 307 may also include a processor that receives audio data from the audio capturing device and processes the data to recognize one or more voice commands. This type of control 307 may remain activated by the user issuing a voice command periodically (or continuously). The control may cease to be activated if the user does not issue the voice command periodically (or continuously). Additionally or alternatively, the control may be deactivated by the user issuing a deactivation voice command.

In another example, the control 307 can be activated by a hand gesture (e.g., the user raises their hand to a predetermined height and forms a fist). In this example, the control 307 may include an image capturing device (e.g., facing the external environment) that captures images of the user's hands or the user may be wearing a set of digital gloves that sense the user's finger position. Alternatively, the user can activate the control 307 by an eye position or motion (e.g., by the user looking in a certain direction or activating using a series of blinks). In these embodiments, a camera may face the user's eye. The control 307 may also include a processor that receives and processes image data from the image capturing device to recognize one or more gestures or motions. This type of control 307 may remain activated as long as the user maintains the hand gesture or eye position. In another example, the control remains activated if the user performs the gesture or motion periodically (or continually). The control may cease to be activated if the user does not perform the gesture or motion periodically (or continually). Additionally or alternatively, the control may be deactivated if the user issues a deactivation command via another hand gesture or eye motion.

In another example, the control 307 is motion or position sensitive. In this example, the user may activate the control 307 by positioning the HMD in a predetermined orientation or location, for example, by tilting or turning their head. For example, the HMD switches to the active state and remains in the active state as long as the HMD is tilted down toward the ground. This may allow the user to operate in the external environment uninterrupted while the HMD is in the idle state but access the active state by looking toward the ground. In these embodiments, the HMD may include one or motion or position sensors, such as accelerometers or gyroscopes.

Figures 4A, 4B, 4C:
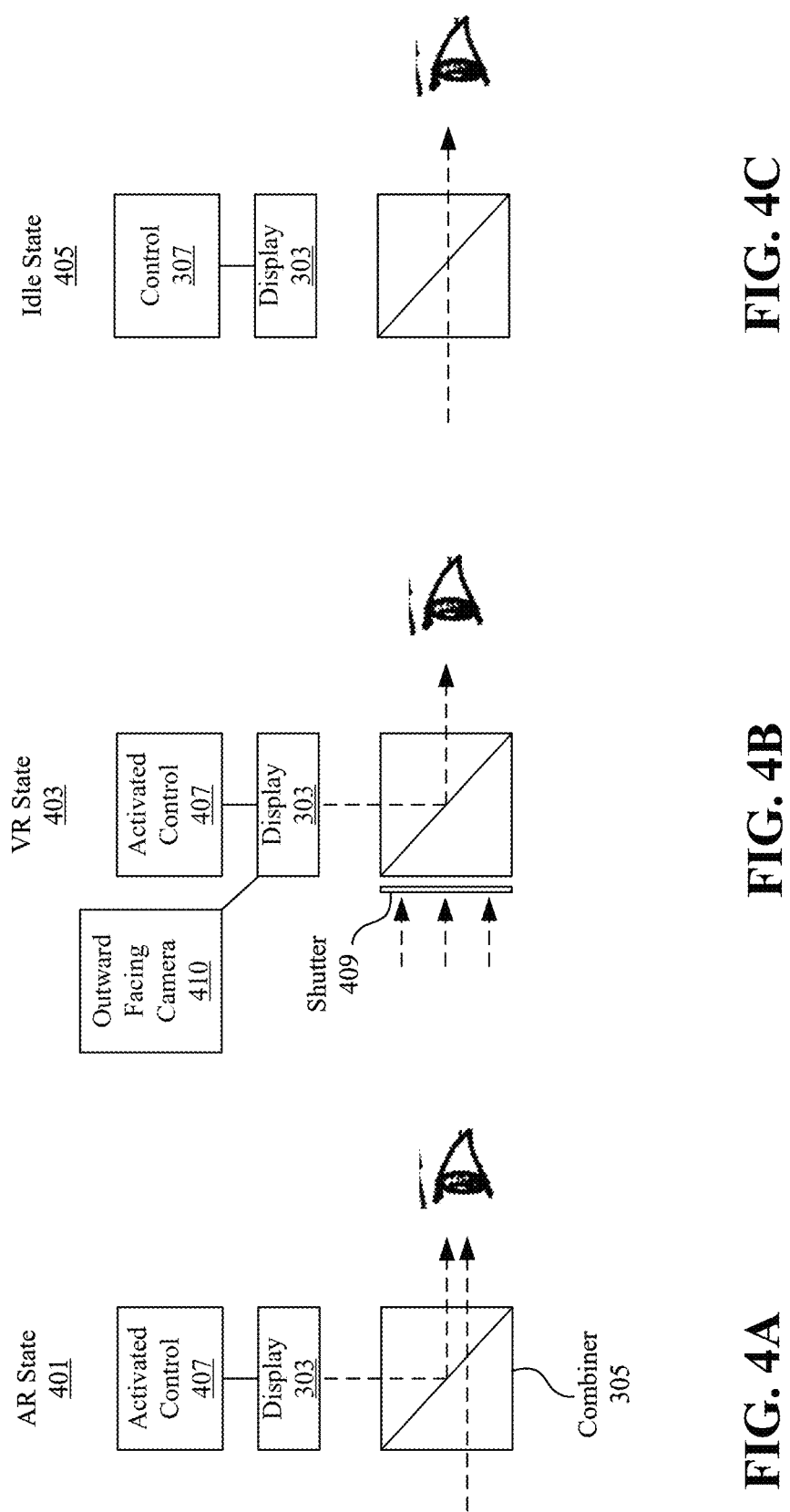
FIGS. 4A-4C are diagrams of various states of the HMD, according to some embodiments.

FIGS. 4A-4C are diagrams of the HMD operating in various operational states, according to some embodiments. FIG. 4A is a diagram of the HMD in an AR state 401, FIG. 4B is a diagram of the HMD in an VR state 403, and FIG. 4C is a diagram of the HMD in an idle state 405. The AR state 401 and the VR state 403 are example active states and, thus, the HMD may only remain in these states while the control is activated 407. If the control is not activated, for example, the HMD is in the idle state 405.

During the AR state 401, AR images are overlaid onto the user's view of the external environment. Thus, during the AR state 401, the HMD may create an interactive experience where objects in the external environment are enhanced by AR images. The AR state 401 may provide a view of an environment that is a combination of the external environment and a virtual environment. The virtual environment may include three-dimensional virtual objects and the HMD may provide real-time interaction with the virtual objects.

During the VR state 403, the display 303 displays VR images. The VR images replace the user's view of the external environment and may create a simulated experience that is similar to or completely different from the external environment. For example, the user is immersed in a virtual environment in which the user can look around, move around, and interact with virtual objects. During the VR state 403, the user may not able to directly see objects in the external environment. For example, the HMD includes a shutter 409 (e.g., a liquid crystal shutter) that blocks light from the external environment from entering the user's eye(s) when the HMD is in the VR state 403 but transmits light when the HMD is in another state.

In some embodiments, the shutter 409 transforms the HMD from an optical see-through HMD to an electronic see-through HMD (also referred to as video see-through HMD). For example, using the shutter 409, the HMD occludes the user's view of the external environment and uses outward facing cameras (e.g., outward facing camera 410) to display images of the external environment and/or electronic information to the user. In some embodiments, the shutter 409 is configured to block or reduce light propagating towards the external environment. For example, the HMD includes a shutter 409, baffles, eyecups, and/or a housing that are configured to block light so that light from the HMD (e.g., while it is in any active state) is not detected by people or light sensors in the external environment. Among other advantages, this allows the HMD to be used at night without the user being detected.

The HMD may have multiple VR states 403. Each VR state 403 may display different VR content to the user. For example, in a first VR state, the user views a first virtual environment, and in a second VR state, the user views a second virtual environment. Similarly, the HMD may have multiple AR states 401 that each display different AR content.

As previously described, during the idle state 405, the display 303 does not emit light or emits a reduced amount of light compared to the active state. In the idle state 405 of FIG. 4C, the display 303 does not emit any light. Thus, the user only views light from the external environment. During the idle state 405, the display 303 may still be "turned on" (e.g., it receives power and is in a standby mode) so that it can quickly display images if the HMD switches to an active state. In some embodiments, the idle state 405 is a low power mode of the display 303 (e.g., if the display is an LCD, the backlight may be turned off). In some cases, the display 303 does not display images during the idle state 405, however it may remain powered on and ready to display imagery. For example, pixel data is not sent to the display 303 or is not sent to pixels of the display. If the display 303 is an LCD, the liquid crystals may remain in a blocking state during the idle state 405. For OLED or microLED displays, the display may be powered on, but the pixels may be set to a black state. Thus, the idle state 405 may result in the user not perceiving light from the display 303. To reduce or eliminate the amount of light observed by the user during the idle state 405, the HMD may include a shutter (not illustrated), such as a liquid crystal shutter, that blocks light from the display 303 from reaching the eye of the user (e.g., and the outside world).

Since the HMD may be used in situations where images from the display 303 may distract the user, the idle state 405 may be a default state of the HMD. The HMD may begin in a default state when it is turned on and may remain in the default state until it receives instructions (e.g., activation of the control 307) to switch states. Said differently, the HMD may switch to a non-default state (e.g., an active state) only if it receives instructions to switch states. The HMD may revert to the default state if the control 307 is deactivated or ceases to be activated. For example, the HMD may automatically switch to the default state if the HMD has been in another state for a threshold amount of time or in the absence of instructions from the user to continue in the current state. In some embodiments, the HMD automatically switches to the default state in response to one or more criteria being met, for example, output from an audio sensor, temperature sensor, or brainwave sensor is above a threshold level.

FIGS. 5A-5E are state diagrams of the HMD, according to some embodiments. Each oval represents an active state 503 or an idle state 501. The HMD transitions to an active state 503 in response to an activation 505 and transitions to an idle state 501 in response to a deactivation 507. Activation 505 refers to the user activating the control. Deactivation 507 may refer to the user deactivating the control, the user ceasing to activate the control, or the HMD being in an active state 503 for a threshold amount of time without the user reactivating the control. There may be multiple methods for activation 505 or deactivation 507 to occur.

Figure 5A:
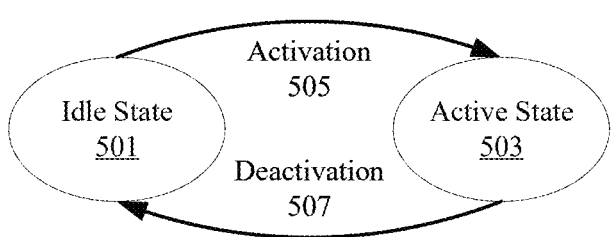
FIGS. 5A-5E are state diagrams of the HMD, according to some embodiments.

FIG. 5A is a state diagram in which the HMD only has two states, an idle state 501 and an active state 503. If the control is activated 505, the HMD switches to the active state 503. Once the control is deactivated 507, the HMD switches back to the idle state 501.

Figure 5B:
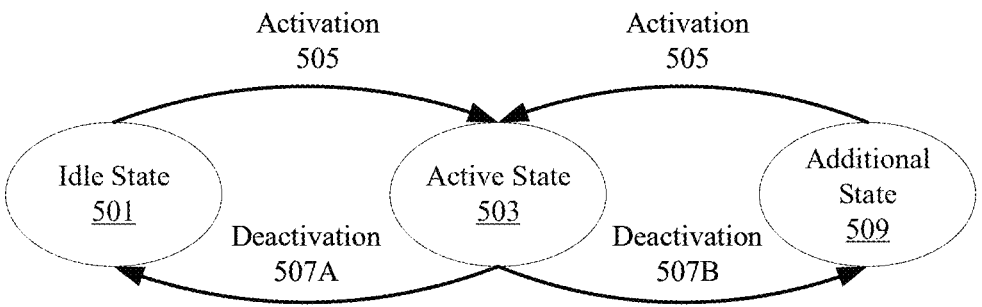

FIG. 5B is a state diagram with an idle state 501, an active state 503, and an additional state 509. If the HMD is in the idle state 501 or the additional state 509, activation 505 of the control switches the HMD to the active state 503. In the example of FIG. 5B, different types of deactivation 507 are possible. If the control is deactivated by a first method 507A, the HMD switches to the idle state 501. Alternatively, if the control is deactivated by a second method 507B, the HMD switches to the additional state 509. In some embodiments, the additional state 509 can be accessed by activating 505 the control (not illustrated). For example, a first activation method switches the HMD to the active state 503 and a second activation method switches the HMD to the additional state 509. In some embodiments, the HMD can switch from the idle state 501 to the additional state 509 (not illustrated).

The additional state 509 is a state other than the idle state 501 or the active state 503. For example, the additional state 509 is an "off state" in which the HMD is powered down. In another example, the additional state 509 repositions the combiner 305 and/or display 303 away from the user's eyes so that the user can directly view the external environment. In another example, during the additional state 509, the display displays images (e.g., similar to the active state) without the control being activated. The additional state 509 can perform any number of operations and the HMD can have any number of additional states 509.

Figure 5C:
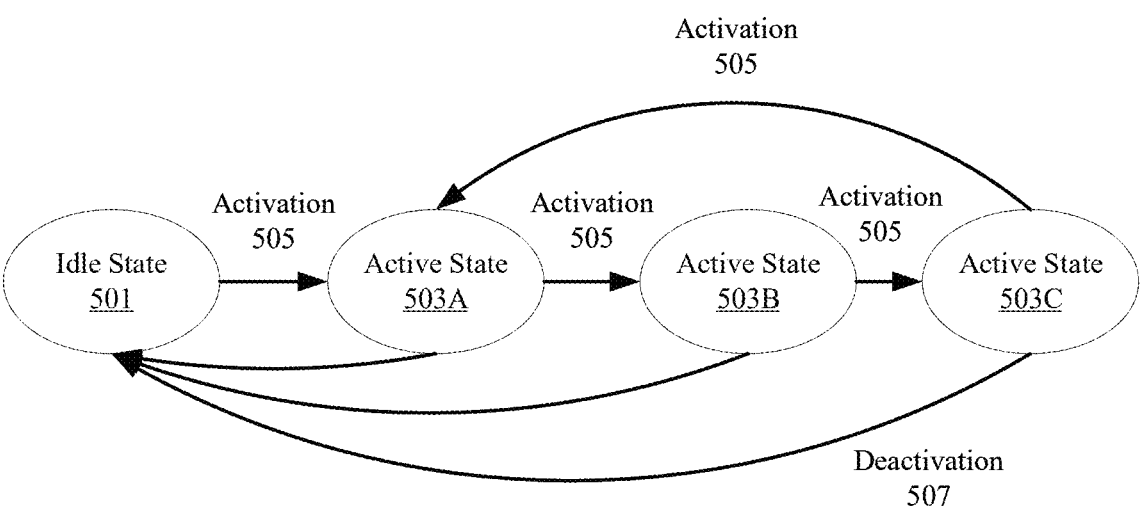

FIG. 5C is a state diagram with multiple different active states 503. As previously described, example active states 503 include the AR and VR states. In embodiments with multiple states (e.g., multiple active states), a visual indicator may be displayed and may change to indicate which state the display is in. While three active states 503 are illustrated, the HMD may include additional or fewer active states 503. If the HMD is in the idle state 501 and the control is activated 505, the HMD switches to active state 503A. If the HMD is in active state 503A and the control is activated 505 again, the HMD switches to active state 503B. The control may be activated 505 again by deactivating the control and reactivating it within a threshold amount of time. Similarly, if the HMD is in active state 503B and the control is activated 505 for a third time, the HMD switches to active state 503C. If the HMD is in active state 503C and the control is activated for a fourth time, the HMD switches back to active state 503A. Thus, in this state diagram, the user can toggle through different active states 503 by activating the control 307 multiple times. Regardless of which active state 503 the HMD is in, the HMD switches to the idle state 501 if the control is deactivated 507.

Figures 5D, 5E:
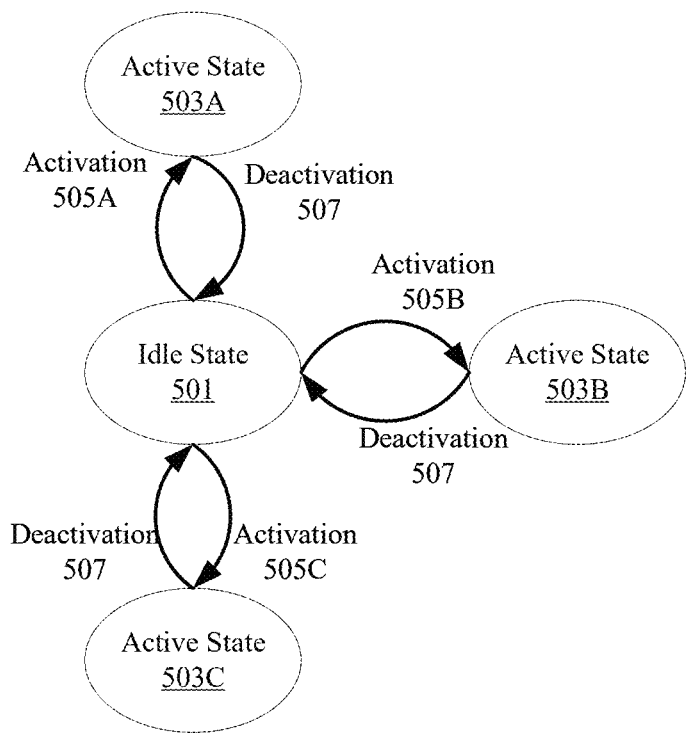

FIG. 5D is a state diagram with multiple active states 503 that may be directly accessed by different methods of activating 505 the control. While three active states 503 and three different activation methods 505 are illustrated, the HMD may include additional or fewer active states 503 and activation methods 505. If the HMD is in the idle state 501 and the control is activated by method 505A, the HMD switches to active state 503A. If the HMD is in the idle state 501 and the control is activated by method 505B, the HMD switches to active state 503B. If the HMD is in the idle state 501 and the control is activated by method 505C, the HMD switches to active state 503C. If the HMD is in a first active state (e.g., 503A), the HMD may switch back to the idle state 501 before it can switch to a second active state (e.g., 503B).

Thus, in the state diagram of FIG. 5D, the user can access a desired active state 503 by activating the control by a specific method. Compared to FIG. 5C, the user may not have to toggle through one or more active states 503 to access a desired active state 503. However, in FIG. 5D, the user may need to remember which activation method 505 is associated with each active state 503. For example, the control includes three buttons where each button is associated with an active state 503. Thus, the user may need to remember which button is associated with each active state 503.

FIG. 5E is a state diagram with two different active states 503 and two different idle states 501. If the HMD is in idle state 501A and the control is activated 505, the HMD switches to active state 503A. If the control is deactivated 507 while the HMD is in active state 503A, the HMD switches to idle state 501B. If the control is activated 505 while the HMD is in idle state 501B, the HMD switches to active state 503B. If the control is deactivated 507 while the HMD is in active state 503B, the HMD switches back to idle state 501A. Active states 503A and 503B may provide the user with the ability to access different content. For example, 503A is an AR state and 503B is a VR state. In another example, 503A and 503B are both AR states but each displays different content. While a single activation method and deactivation method are illustrated, the HMD may include additional methods. For example, an additional deactivation method may switch the HMD from active state 503A to idle state 501A.

In the state diagram of FIG. 5E, the user can toggle between different active and idle states by consecutively activating 505 and deactivating 507 the control. Among other advantages, since there is a single activation method and a single deactivation method, the user does not need to remember multiple activation or deactivation methods (which may be the case for the previous state diagrams).

While system of this disclosure is described above as being used in an HMD, the system is not limited to HMDs. For example, the system of this disclosure can be applied to binoculars, tank sights, gun sights, and other devices that a user may look through.

While this disclosure describes the idle state being a default state, in some embodiments, the active state is a default state. In these embodiments, the system may remain in the idle state only while the control remains activated by the user. These embodiments may allow the user to continuously view images from the display but temporarily remove the images by activating the control, for example, to get a better view of the external environment.

In other embodiments, the present disclosure provides an HMD that can quickly switch between the active state and a default state of the HMD. As previously described, the HMD may begin in the default state when it is turned on and may remain in the default state until it receives instructions (e.g., activation of the control) to switch states. Said differently, the HMD may switch to a non-default state (e.g., an active state) only if it receives instructions to switch states. The HMD may revert to the default state if the control 307 is deactivated or ceases to be activated. For example, the HMD may automatically switch to the default state if the HMD has been in another state for a threshold amount of time or in the absence of instructions from the user to continue in the current state. In some embodiments, the HMD automatically switches to the default state in response to one or more criteria being met, for example, output from an audio sensor, temperature sensor, or brainwave sensor is above a threshold level. The default state may allow the user to view and operate in the external environment.

The default state, in these embodiments, may be the idle state or another state, such as a state that display's images (e.g., similar to the active state) without the control being activated. For example, during the default state, the display 303 displays AR images to the user (e.g., similar to the AR state 401). In some cases, the display displays images using low amounts of light during the default state. Since it may be desirable for the images from the display to not distract the user, the images may be small and/or located away from the user's central field of view (e.g., in the user's periphery). These images may be referred to as "reduced AR images" herein. For example, a small image, such as the time, date, or the remaining battery level of the HMD, is displayed in a corner of the user's view. In another example, during the default state, the display 303 may use not more than 10% of its pixels to display the images, the amount of light emitted by the display 303 may not be more than 10% of the amount of light emitted during an active state, and/or the power consumed by the display 303 may not be more than 10% of the power consumed by the display 303 during an active state. In another example, images displayed during the default state are not more than 10% of the size of images displayed during the active state.

By activating the control, the user can cause the HMD to temporarily switch from the default state to the active state (or to another state). The HMD may remain in the active state only while the control remains activated by the user and may switch back to the default state (or another state) once the user deactivates or ceases activating the control. Example state diagrams of the HMD according to these embodiments may be understood by replacing "Idle State 501" with "Default State" in FIGS. 5A-5E.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Note that the components illustrated and described can include any electronics and/or computer instructions that may be embodied in digital or analog circuits. This may be implemented using any one or more of application specific integrated circuits (ASICs), field-programmable gate arrays (FPGAs), and general-purpose computing circuits, along with corresponding memories and computer program instructions for carrying out the described operations. The specifics of these components are not shown for clarity and compactness of description.

What is claimed is:

1. A system comprising:

an outward facing camera arranged to capture images of an external environment in front of a user;

a display configured to display images;

a beam combiner that provides a first optical path and a second optical path, the first optical path directing images from the display to an eye of the user, and the second optical path directing light from the external environment to the eye of the user;

a shutter positioned along the second optical path, wherein the system is configured to operate in one of a plurality of states comprising:

an electronic see-through state where the shutter occludes the eye's view of the external environment through the second optical path and the display displays images of the external environment based on images captured by the outward facing camera; and an optical see-through state where the shutter is in an open state that enables the eye of the user to view the external environment through the second optical path and the display emits no light or a reduced amount of light compared to the electronic see-through state, wherein the electronic see-through state is a default state of the system, and the optical see-through state is a non-default state of the system; and a control configured to automatically switch the system from the default state to the non-default state based on output from a sensor indicating a battery level of the system.

2. The system of claim 1, wherein the electronic see-through state enables the user to operate in the external environment using the images of the external environment from the display.

3. The system of claim 1, wherein, during the optical see-through state, the display does not display images of the external environment.

4. The system of claim 3, wherein, during the optical see-through state, the display displays images with information that modifies or augments the eye's view of the external environment.

5. The system of claim 1, wherein the plurality of states further comprise:

an augmented reality (AR) state where the shutter is in the open state that enables the user to view the external environment through the second optical path and the display displays information that modifies or augments the external environment.

6. The system of claim 5, wherein, during the AR state, the display displays reduced AR images that propagate along the first optical path and combine with the light from the external environment at the eye, and the reduced AR images are less than 10% and more than 0% of a size of the images displayed during the electronic see-through state.

7. The system of claim 1, wherein the display is not powered on during the optical see-through state.

8. The system of claim 1, wherein the display does not display images during the optical see-through state.

9. The system of claim 1, wherein pixel data is not sent to the display during the optical see-through state.

10. The system of claim 1, wherein pixel data is not sent to pixels of the display during the optical see-through state.

11. The system of claim 1, wherein the system is part of a head-mounted display.

12. The system of claim 1, further comprising:

a user-operated second control configured to, responsive to activation by the user, switch the system between states that include the electronic see-through state and the optical see-through state.

13. The system of claim 12, wherein the system remains in the optical see-through state only while the user-operated second control remains activated by the user.

14. The system of claim 12, wherein the user-operated second control is a mechanical control.

15. The system of claim 14, wherein the user-operated second control is activated when the user-operated second control is held in an activated position or periodically moved to the activated position.

16. The system of claim 15, wherein the system automatically switches states of the plurality of states responsive to the user ceasing to hold the user-operated second control in the activated position or ceasing to periodically move the user-operated second control to the activated position.

17. A system configured to provide an image for viewing by a user wearing a head-mounted display, the head-mounted display comprising:

a frame configured to be worn by the user;

a display supported by the frame and configured to output light to form images;

a beam combiner that is partially reflective and partially transmissive;

an electrically switchable shutter having a closed state configured to block light from an external environment in front of the shutter from entering an eye of the user and an open state;

a camera facing the external environment in front of the shutter and configured to capture images of the external environment and to present the images to the display for viewing by the eye, wherein:

the electrically switchable shutter is disposed in an optical path between the beam combiner and the external environment, the beam combiner is positioned (i) in an optical path of light output by the display such that at least a portion of light from the display propagates to the beam combiner and then to the eye of the user to form images produced by the display that are viewable by the eye and (ii) in an optical path of light from the external environment in front of the shutter such that at least a portion of light from the external environment propagates to the beam combiner and then to the eye when the shutter is in the open state, and a default state of the system includes the shutter being in the closed state and a non-default state of the system includes the shutter being in the open state; and a control configured to automatically switch the system from the default state to the non-default state based on output from a sensor indicating a battery level of the system.

* * * * *